Oct. 6, 1931.   R. E. BECHTOLD   1,826,340
LIQUID DISPENSING APPARATUS
Filed July 18, 1930   7 Sheets-Sheet 2

Oct. 6, 1931.   R. E. BECHTOLD   1,826,340
LIQUID DISPENSING APPARATUS
Filed July 18, 1930   7 Sheets-Sheet 4

Reuben E. Bechtold INVENTOR
BY
H. G. Burns ATTORNEY

Patented Oct. 6, 1931

1,826,340

UNITED STATES PATENT OFFICE

REUBEN E. BECHTOLD, OF FORT WAYNE, INDIANA, ASSIGNOR TO THE TOKHEIM OIL TANK AND PUMP COMPANY, A CORPORATION OF INDIANA

LIQUID DISPENSING APPARATUS

Application filed July 18, 1930. Serial No. 468,807.

This invention relates to improvements in liquid dispensing apparatus of the type usually employed at filling stations for automobiles.

An object of the invention is to provide an appliance for dispensing liquid fuel in definite quality units accurately measured so that both the patron and the merchant are assured of the amount of fuel dispensed in each operation of the apparatus.

Other objects and advantages will appear in the following description.

An illustrative embodiment of the invention is shown in the accompanying drawings, in which:—

The apparatus shown in the drawings is comprised of a liquid supply unit; an air or gas separating unit; a measuring unit; regulating means for the supply and measuring units; and a recording unit operatively associated with the measuring unit. Also other features of construction are included in the apparatus that contribute facility in the operation thereof, as will appear in the following description.

The several parts of the apparatus are contained in a pedestal consisting of a base 1, posts 2, capitol 3 and a shelter 4 superimposed upon the pedestal provided with a dome 5.

The liquid supply unit

Initially, liquid, such as gasoline, is supplied to the dispensing apparatus from a reservoir (not shown) located conveniently and of a type common in the practice, the flow of the liquid being induced by means of a pump 6 operated conveniently by an electric motor 7.

Figures 13, 14:
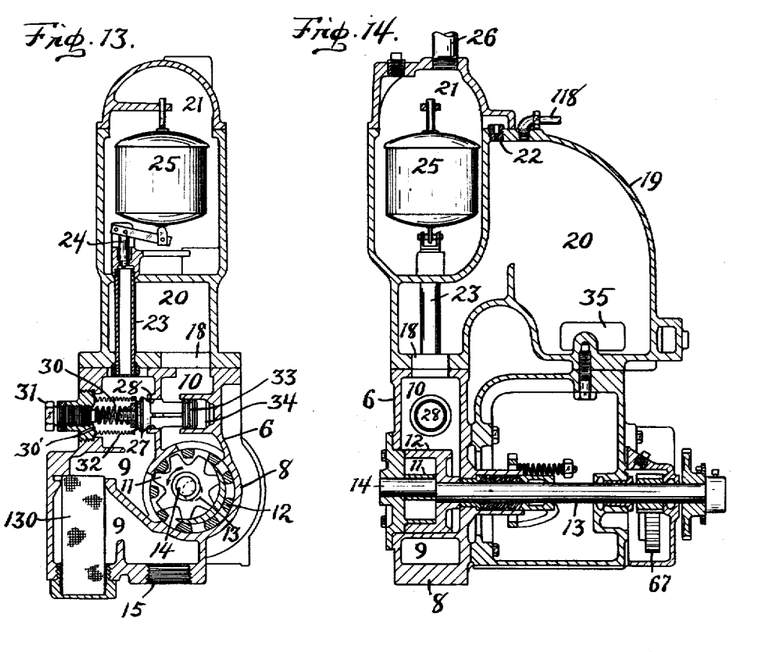
Fig. 13 is a vertical elevation of the supply pump and air separator unit.
Fig. 14 is an elevation projected from Fig. 13 in a plane at right angles thereto.

The particular type of pump, being immaterial to the invention, is here shown as an example. In this instance the pump is of the rotary type of known construction having a housing 8 (Figs. 13—14) provided with a suction chamber 9, outlet chamber 10, rotors 11 and 12, and a drive-shaft 13 for the rotor 12, the rotor 11 being mounted idly upon a stud 14 and arranged to be driven by the other rotor. The intake port 15 of the pump is connected by a pipe (not shown) with the reservoir previously mentioned, and the drive-shaft 13 is connected with the motor 7 by a drive chain 16. Upon operation of the pump gasoline is drawn from the reservoir through the suction port 15 and expelled through the discharge port 18 of the pump. (Figs. 13—14.)

The separator unit

Means are provided to eliminate from the gasoline after it is expelled through the discharge port 18 of the supply pump air or gas that accumulates in the gasoline, due to agitation thereof or otherwise, and such means consists of a unit having a case 19 provided with a receiving chamber 20 that has free communication with the discharge chamber 10 of the supply pump through the port 18. The case has also a secondary or float chamber 21 therein that has constant communication with the receiving chamber 20 through a choke nipple 22, the bore through the nipple being sufficiently small as to restrict the flow of fluid therethrough. The float chamber 21 has a pipe connection 23 (Figs. 13—14) with the suction chamber 9 of the supply pump, and a valve 24 operated by a float 25 in the float chamber is arranged to control the flow of liquid from the float chamber through the pipe connection 23 into the suction chamber 9 of the supply pump. When liquid accumulates in the float chamber sufficiently to cause the float to rise, the valve is thereby opened permitting the accumulated liquid to enter the suction chamber of the supply pump. A vent pipe 26 extends from the upper end of the float chamber through which air or gas is permitted to escape.

The supply pump has a by-pass valve 27 that controls a port 28 through which liquid in the outlet chamber 10 is admitted into the suction chamber when the by-pass valve is open. The valve 27 is held normally in closed position by a spring 30 one end of which bears against the valve and its other end against an adjusting screw 31 so that said by-pass valve is yieldingly sustained in closed position against the pressure of liquid in the outlet chamber 10. An expansible cup 32 is connected with the by-pass valve 27 and encompasses the spring 30 and is closed to the suction chamber 9 and opened to the atmosphere through a vent 30'. The mean diameter of the cup is substantially equal to that of said valve so that any influence such as to impart movement to the valve by vacuum in the suction chamber is circumvented. Because of this provision opening of the by-pass valve is occasioned only by pressure developed by the supply pump in its outlet chamber 10.

Any air or gas that enters the separator chamber with the liquid received therein from the supply pump passes from the chamber through the choke nipple into the float chamber and from thence escapes through the vent pipe 26. Any liquid that passes from the separator chamber into the float chamber accumulates therein until the accumulated body is sufficient to raise the float 25, whereupon the valve 24 is raised which permits the accumulation of liquid to pass into the suction chamber 9 of the supply pump.

The measuring unit

Figures 15, 16:
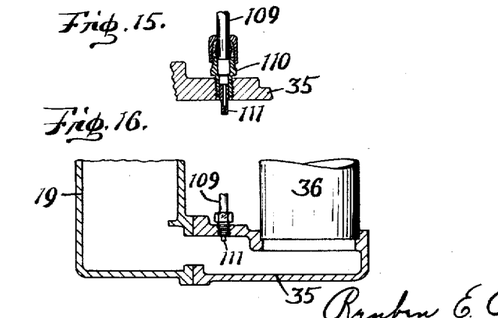
Fig. 15 is a detail view showing in section a choke member for the regulator unit.
Fig. 16 is another detail view showing the choke member located in connection with related parts of the apparatus.

The liquid, upon entering the separator chamber 20 from the supply pump settles therein and passes therefrom through a discharge duct 35 (Figs. 14—16) located in the lower part of the case 19 and passes into a measuring unit which is comprised of a pump having two cylinders 36 and 37 (Figs. 17—18—19), the top of the cylinder 36 being connected with the bottom of the cylinder 37 by a duct 38, and the lower end of the cylinder 36 being connected with the separator chamber through the duct 35. Each of the cylinders 36 and 37 has therein a plunger 36' and 37' respectively, each plunger being provided with a corresponding spring pressed valve 36" arranged to permit passage of liquid upwardly through the plungers.

Figures 5, 6, 7:
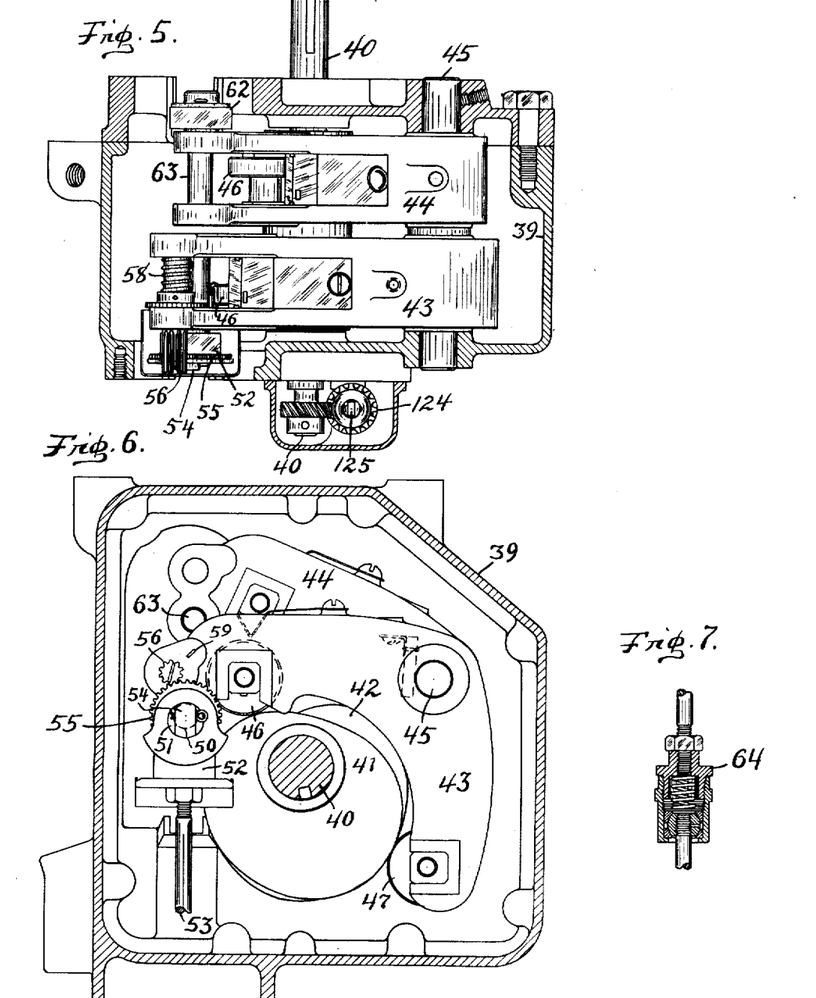
Fig. 5 is a plan showing a horizontal section through the cam actuated mechanism for the measuring unit.
Fig. 6 is an end elevation projected from Fig. 5, parts being in section.
Fig. 7 is a detail showing a vertical section of the jointed connection used for the driving rods of the measuring unit.
Figures 8, 9, 10, 11, 12:
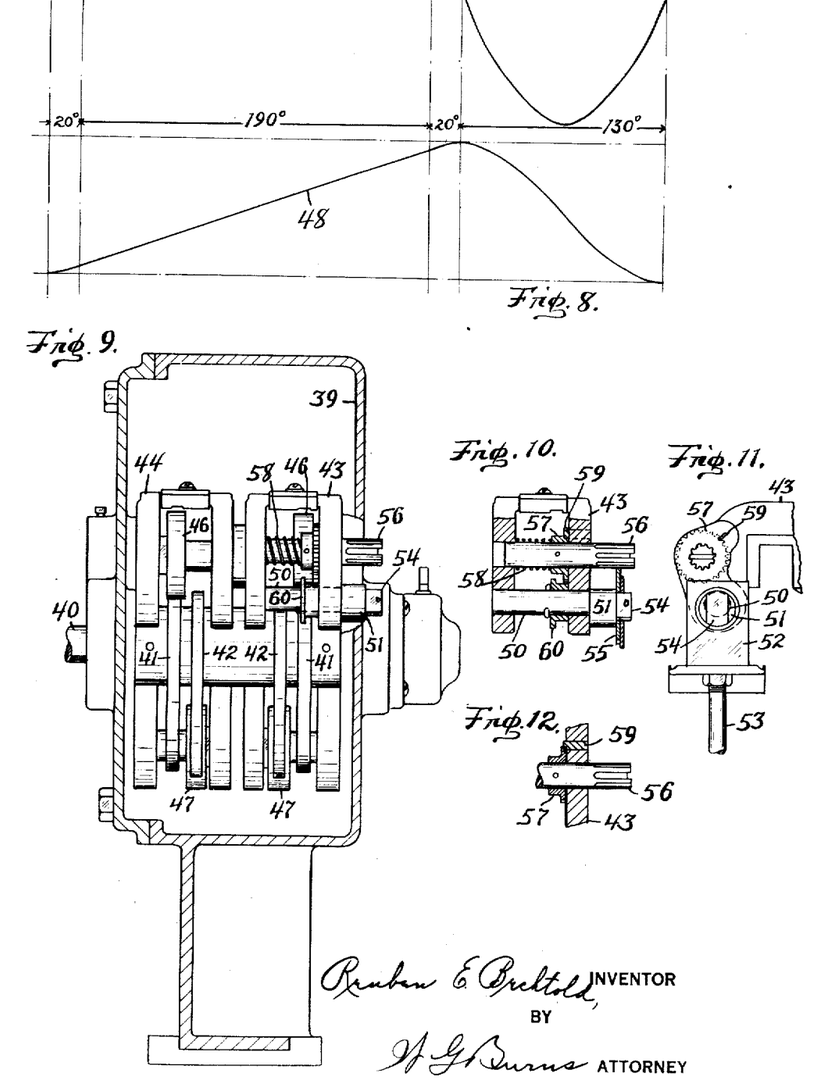
Fig. 8 is a chart showing graphically characteristics of the travel of the plungers in the measuring unit.
Fig. 9 is a vertical section of the cam mechanism for actuating the measuring unit.
Figs. 10, 11 and 12 are detail views of adjusting mechanism for the measuring unit.

The plungers 36' and 37' are actuated by a cam mechanism (Figs. 5—6—9) which is conveniently encased in a housing 39 supported in the pedestal above the measuring cylinders. The cam mechanism has a drive-shaft 40 having keyed thereon two pairs of cams 41 and 42 operatively related with corresponding rockers 43 and 44 that are mounted so as to oscillate upon a common shaft 45. Each rocker has a roller 46 mounted adjacent the outer end of one of its arms which bears upon the corresponding cam 41, and has a similar roller 47 mounted adjacent the end of its other arm that bears upon the corresponding cam 42. The cams are so shaped and arranged upon their drive-shaft 40 as to cause oscillating movement of the rockers without permitting lost motion as well as to cause the rockers to move in one direction at a constant relative speed for the greater portion of the upward stroke of the corresponding plunger.

In the chart (Fig. 8) the line 48 is a graphic indication of the progression of the perimeter of one of the cams from and toward its axial center throughout its circumference, and the line 49 is a similar indication of the rate of movement imparted to the plunger connected with the rocker that is actuated by the cam.

In the outer end of the upper part of the rocker 43 is journaled a shaft 50 having an extending end provided with an eccentric 51 upon which is mounted a head 52 that is secured to the upper end of a piston rod 53 which is connected with the plunger 37' of the upper cylinder 37 so that as the rocker 43 is oscillated said plunger is actuated accordingly. The length of the stroke imparted by the cam 43 to the plunger 37' is dependent upon the axial adjustment of the shaft 50, as by turning said shaft the center of the eccentric is moved toward or from the axis of the shaft 45 upon which the rocker turns. The outer end of the shaft 50 also has a flattened projection 54 upon which is mounted a gear 55 that is meshed with the toothed outer end of a shaft 56 which is mounted in the rocker 43 so as to have rotary and axial movement therein. A toothed-wheel 57 is pinned on the shaft 56, and a spring 58 bears against the hub of the wheel 57 so that the shaft 56 is yieldingly held in its outermost position. A pin 59 secured in the rocker 43 has locking relation with the wheel 57 by engagement with the teeth thereof when the shaft 56 is in its outermost position. Upon the shaft 50 is secured a flange 60 located so as to limit inward movement of the shaft 56 by engagement with the wheel 57. The outer end of the shaft 56 is slotted to receive a screw driver. By pressing inwardly on the shaft 56 the wheel 57 is moved out of engagement with the pin 59 whereupon the shaft 56 may be turned so that the shaft 50 is rotated thereby through the medium of the gear 55. In this manner the eccentric 51 is adjustably positioned with respect to the axis of the rocker-shaft 45 and the stroke of the piston-rod 53 thereby lengthened or shortened accordingly. Thus, the quantity of liquid delivered through the measuring unit during its cycle of movement is adjustably varied. The plunger 36' in the cylinder 36 has a piston rod 61 provided with a head 62 (Fig. 5) that is connected with the rocker 44 upon a shaft 63 thereon so that movement is imparted to said plunger as the rocker 44 is actuated. Each of the piston rods 53 and 61 is provided with a flexible joint 64 of any suitable construction, such as that shown in Fig. 7, to permit arcuate movement of the upper end portion of the piston rod as it is actuated by the rocker with which it is connected.

Figure 1:
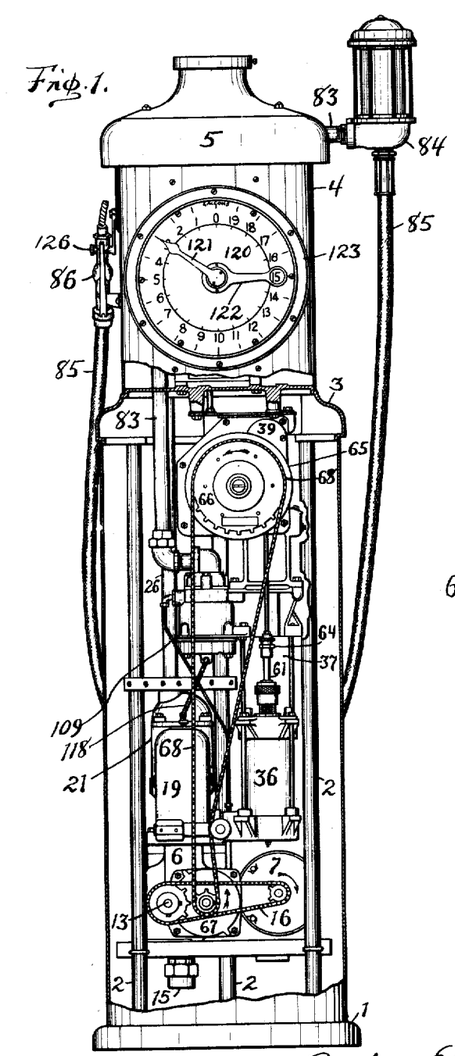
Fig. 1 is a front elevation of a dispenser in which the invention is involved, a portion of the shelter being cut away to disclose the mechanism contained therein.
Figure 2:
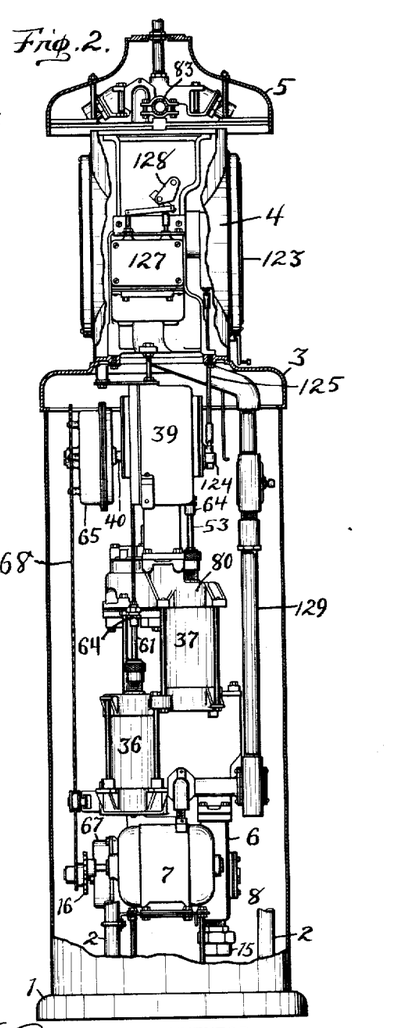
Fig. 2 is another elevation projected from Fig. 1 in a plan at right angles thereto.
Figure 3:
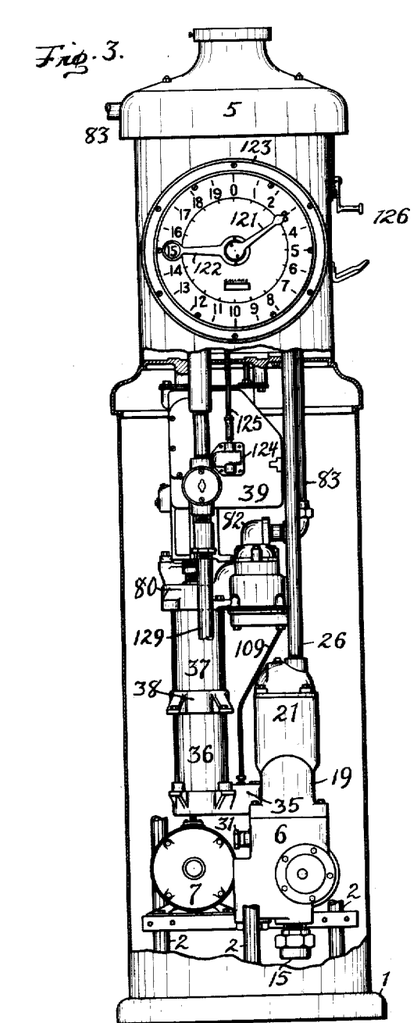
Fig. 3 is an elevation of the same apparatus viewed from a point opposite from that of Fig. 1.
Figure 4:
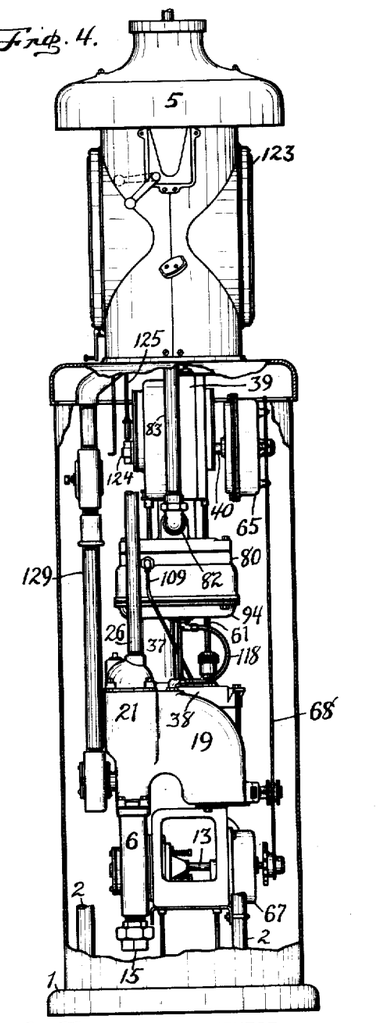
Fig. 4 is a view projected from Fig. 3.

A driving means is provided for the cam actuating mechanism which is comprised of a clutch 65 provided with a sprocket 66, the clutch being secured upon the extending end of the cam shaft 40. A suitable gearing 67 is operatively related with the drive-shaft 13 for the pump 6 (Figs. 1—2—14) and also with the sprocket-wheel 66, there being a chain 68 connecting the gearing 67 and said sprocket-wheel whereby as the pump 6 is actuated the clutch is revolved accordingly.

Figure 20:
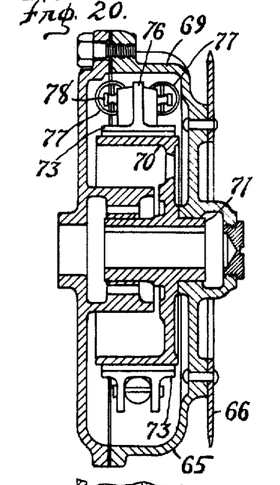
Fig. 20 is a vertical section of a clutch for actuating the cam mechanism.
Figure 21:
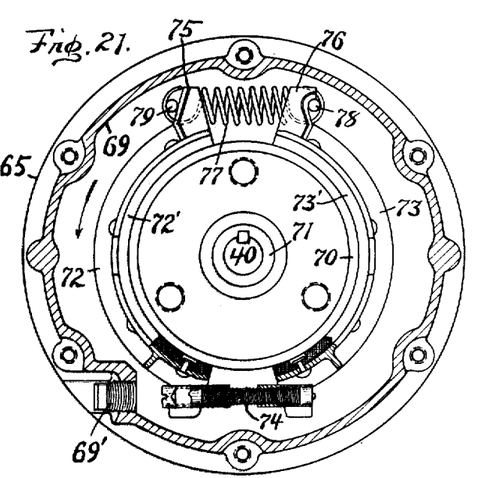
Fig. 21 is a projection of Fig. 20 in a plane at right angles thereto.
Figure 22:
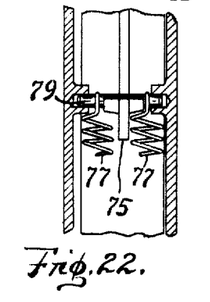
Fig. 22 is a fragmentary plan view projected from Fig. 20.

The construction of the clutch is such that when operated the cam shaft will be actuated when under normal load, and when the load on the cam-shaft is increased to a predetermined point the clutch automatically is relieved so as to rotate idly or without actuating the cam shaft. A preferred form of such a clutch is illustrated as an example in Figs. 20—21—22. In this instance, the clutch 65 is comprised of a circular housing 69 in which is contained a friction drum 70 upon the hub 71 of which the housing 69 is journaled so as to rotate freely thereon. The hub of the friction drum is secured upon the extending end of the cam shaft 40 so that upon rotation of the drum the cam shaft is actuated. The drum is encompassed by an engaging member having oppositely disposed shoes 72 and 73 provided with brake linings 72' and 73', the opposed ends of the shoes being spaced apart. One end of the shoe 72 is coupled with the adjacent end of the shoe 73 by means of an adjusting screw 74. The opposite ends of the shoes are provided each with a radially disposed jaw 75 and 76 respectively, which jaws are drawn toward each other by contracting springs 77, the springs being connected at one end with the jaw 76 by a pin 78, the opposite ends of said springs being connected with a driving pin 79 that is secured in the housing 69 and against which pin the jaw 75 has bearing contact. When the housing 69 is rotated in the direction indicated by the arrow the engaging member is rotated, movement being imparted thereto by the pin 79 through the springs 77 that connect the pins 78 and 79. By turning the screw 74 in one direction or the other, the tension of the springs 77 is adjustably increased or decreased according to the direction in which the screw 74 is turned, and in this manner the pressure of the shoes upon the friction drum is adjustably varied, whereby more or less torque is correspondingly applied by the engaging member to the friction drum as the clutch revolves. Thus, while the clutch 65 continues in motion, the measuring unit is progressed with varying speed or is without movement according to the load on the cam actuating mechanism. Upon removal of a plug 69' in the housing 69 access is had to the screw 74 to permit adjustment thereof whereby pressure of the shoes upon the friction drum is regulated.

Figure 17:
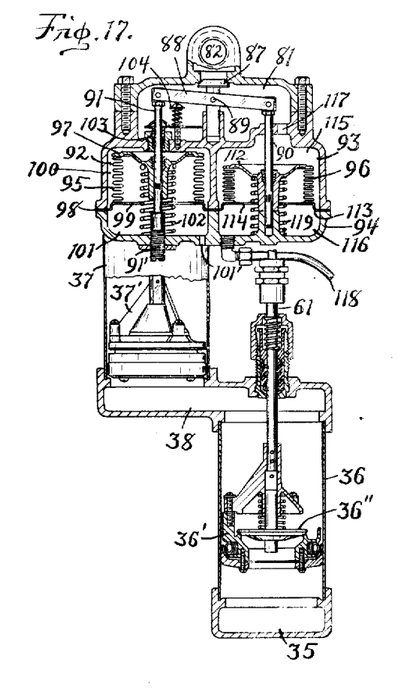
Fig. 17 is a vertical section of the regulating means, and the measuring unit.
Figure 18:
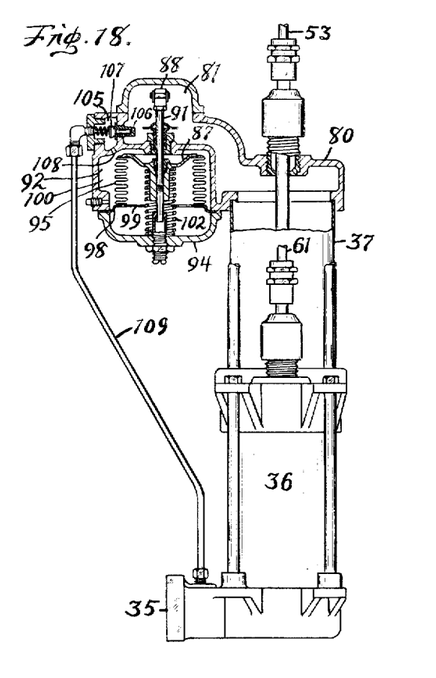
Fig. 18 is a section projected from Fig. 17 in a plane at right angles thereto.
Figure 19:
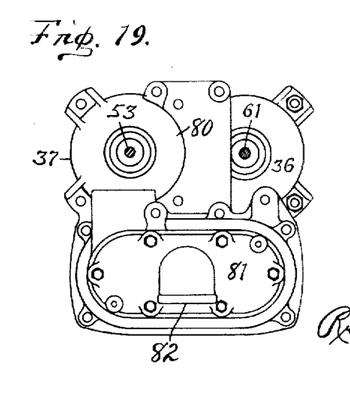
Fig. 19 is a plan projected from Fig. 17.

The upper end of the cylinder 37 is provided with a head 80 having a chamber 81 therein and an outlet 82 leading therefrom. (Figs. 17—18). A discharge pipe 83 is connected with the outlet 82 (Figs. 1—3—4) which extends up through the dome 5 and has on its extending end an indicating gauge 84 of usual construction, there being a hose 85 connected with the gauge and provided with a valve controlled nozzle 86 through which gasoline after passing through the measuring unit is dispensed.

The regulating means

The outlet 82 for the chamber 81 (Fig. 17) is provided with a valve 87 by which the discharge of gasoline from the measuring unit is controlled. The valve 87 is operatively connected with regulating mechanism comprised of a lever 88 pivoted at its middle to the stem of the valve as indicated by 89, each end of said lever having pivoted thereto a corresponding actuating rod 90 and 91 respectively. The head 80 is provided with two additional chambers 92 and 93 located beneath the chamber 81 that are closed at their lower ends by a hollow cap 94, each containing an expansible cup 95 and 96 respectively that are secured upon the corresponding rod 91 and 90.

The top of the cup 95 is closed by its head 97 which is secured to the rod 91, and the rim of said cup at its lower end is secured upon a partition 98, that extends horizontally in the chamber 92, provided with a central aperture 99. Thus, the chamber 92 has compartments 100 and 101 that are separated by the cup and the partition so that passage of fluid from one compartment into the other is prevented. A compression spring 102 is disposed within the compartment 101 and bears upwardly against the head 97 of the cup 95. A stuffing box 103 for the rod 91 is disposed to prevent leakage of fluid from the chamber 81 into the chamber 92, there being a spring pressed fastener 104 for the gland of the stuffing box. The head 80 has also a pocket 105 connected with the chamber 81 by a nipple 106 that is normally closed by a spring pressed relief valve 107 disposed so as to permit escape of fluid from said chamber into the pocket should pressure in the chamber 81 become excessive. The compartment 92 has communication with the pocket 105 through an open port 108, and the pocket has communication with the duct 35 through a pipe connection 109, whereby pressure is created in the compartment 92 by force of fluid supplied to the pocket, whereupon the expansible cup 95 is compressed and the rod 91 actuated downwardly which has the tendency of opening the valve 87. The pipe 109 is connected with the duct 35 by a coupling 110 provided with a choke nipple 111 so that the flow of liquid through the pipe and the duct is restricted and erratic action of the cup 95 thereby prevented. The compartment 101 has a vent opening 101', and an adjustable stop 91' positioned in the cap 94 limits downward movement of the cup and also serves as a guide for the rod 91.

The top of the cup 96 is closed by its head 112 which is secured to the rod 90 and has limited downward movement, and the rim of said cup at its lower end is secured upon a partition 113, that extends horizontally in the chamber 93, provided with a central aperture 114. Thus, the chamber 93 has compartments 115 and 116 that are separated by the cup and said partition so that passage of fluid from one of said compartments into the other is prevented. The chamber 81 has communication with the compartment 115 through an open port 117, and the compartment 116 has communication with the separator chamber 20 through a pipe connection 118. A compression spring 119 is disposed within the compartment 116 and bears upwardly against the head 112 of the cup 96. Pressure is created in the compartment 115 by fluid that enters said compartment from the chamber 81 tending to cause the cup 96 to be compressed downward and the regulating valve 87 to open, and pressure is created in the compartment 116 by fluid entering said compartment through the connection 118 from the separator chamber which tends to cause the cup 96 to expand and the regulating valve 87 to close.

The purpose of the regulating means is to automatically restrict the discharge of gasoline from the measuring unit out through the discharge pipe during the dispensing operation sufficiently to prevent the flow of gasoline from the supply pump 6 up through the plungers 36' and 37' without concurrent operation of said plungers, as well as to restrict movement of the plungers to an extent consistent with the volume of gasoline passing through the discharge outlet. To this end the regulating unit is disposed and applied in connection with the measuring unit so that the discharge of gasoline from the measuring unit out through the discharge pipe is effected only upon operation of the plungers.

The recording unit

The recording unit may be of any suitable construction such as that type ordinarily used in connection with gasoline dispensers provided with a dial 120 over which indexes 121—122 are caused to move and thus indicate the quantity of gasoline as it is dispensed from the apparatus which indexes are suitably connected with the measuring unit so as to be actuated concurrently therewith. As an example, a recording unit 123 is positioned in the shelter 4 and connected with the cam shaft 40 for the actuating means of the measuring unit by means of gearing 124 and a connecting rod 125, the gearing being constructed in any suitable manner so that upon rotation of the cam shaft the indexes will be progressed respectively to definitely predetermined extents accurately proportionate to that of the cam shaft so as to indicate the amount of gasoline discharged through action of the measuring unit.

One of the features of the dispenser is an arrangement for suspending the end of the dispensing hose 85 by attaching its nozzle 86 conveniently upon a crank 126 that is operatively related with an electric switch 127 through the medium of suitable mechanism such as a toggle 128 located in the shelter 4, said switch being connected in circuit with a suitable source of energy and the motor 7 in the usual manner by conductors (not shown) that are contained in a conduit 129 located in the pedestal. The toggle 128 and crank 126 are so disposed in relation to each other and with the switch 127 that when the hose is suspended from the crank by hooking the nozzle thereon, the crank is thereby turned downwardly causing the switch to be opened, so that the motor is inoperative.

*Operation*

In the operation of the apparatus, the dispensing nozzle first is removed from the switch crank 126 and the switch is closed manually by raising the crank which causes operation of the motor and the supply pump 6 actuated thereby. The nozzle is then placed in position with its valve closed in readiness for delivering gasoline into the patron's receptacle. As the supply pump is actuated the gasoline drawn through the intake 15 from the reservoir into the suction chamber 9 is filtered by a screen 130 located conveniently in the suction chamber, after which the gasoline by action of the rotors 11 and 12 is circulated within the supply pump past the by-pass valve 27 together with the overflow that enters the suction chamber 9 past the float valve 24, and pressure is developed in the separator 20 and the duct 35 that leads to the measuring unit. Also, as the clutch 65 revolves torque is applied to the cam shaft 40 which tends to cause operation of the plungers in the measuring unit and pressure of gasoline to be developed in the chamber 81 which normally becomes greater than the pressure in the separator chamber and the duct 35. Thus, when the apparatus is in condition for the dispensing operation, the cup 96 is compressed to its lowermost position by pressure of gasoline in the compartment 115 which enters through the port 117 from the chamber 81. Due to pressure applied to the compartment 100 from the duct 35, the cup 95 is compressed and the valve 87 thereby opened. Gasoline is then dispensed from the hose nozzle by manually opening its valve, the flow of gasoline being forced by pressure developed by the supply pump and augmented by operation of the plungers in the measuring unit.

Should operation of the plungers in the measuring unit during the discharge of gasoline from the chamber 81 be so rapid that the pressure in the duct 35 and compartment 100 is materially reduced, the cup 95 thereupon is expanded by action of the spring 102 so that the valve 87 is elevated and the flow of gasoline from the chamber 81 into the discharge pipe is restricted causing a rise of pressure in the chamber 81 which restrains movement of the plungers and consequent increased slipping of the clutch. In this manner a sufficient pressure is maintained in the discharge chamber 81 by which the speed of the plungers is regulated, while normal pressure developed by the supply pump is maintained in the chamber 20 and duct 35.

When pressure is no longer maintained in the duct 35 and compartment 100 by operation of the supply pump, as when the motor is turned off, and the pressure in the chamber 20 is relieved through the nipple 22, the cup 95 is permitted to expand by action of the spring 102 so that the valve 87 is closed and the cup 96 is held in its lowermost position. The strength of the spring 102 being greater than that of the spring 119 the cup 96 is retained in its lowermost position when the valve 87 is closed by the expansion of the cup 95.

The purpose of the cup 96 and its operable connection with the valve 87 is to close the valve in the event the pressure in the duct 35 developed by the supply pump too closely equals that in the chamber 81 because of failure of the measuring unit or its actuating mechanism to function properly, and thus prevent the escape of gasoline from the supply pump through the measuring unit into the discharge pipe. For instance, should the torque applied by the clutch to the cam mechanism become insufficient to sustain the plungers of the measuring unit in motion at a rate of speed sufficient to insure movement of the gasoline thereby through the measuring unit up to not less than the capacity of the supply pump, insufficient pressure in the chamber 81 to counterbalance the pressure developed by the supply pump would result upon opening of the valve 87 by compression of the cup 95 and opening of the valve of the dispensing nozzle. In such instance, the pressure in the compartment 115 would become reduced to approximate parity with that in the compartment 116 which would permit the cup 96 to expand because of pressure of the spring 119 and cause the valve 87 to close. In this manner discharge of gasoline from the supply pump out through the measuring unit and dispensing nozzle without measurement by proper action of the plungers is circumvented.

In order to insure quick action of the cup 96, the port 117 and the connection 118 are made of ample size to permit copious flow therethrough so that changes of pressure in the compartments 115 and 116 are substantially concurrent with those in the chamber 81 and the duct 35 which insures sensitive action of the cup 96 in closing the valve 87.

During the dispensing operation when the nozzle valve is wide open, such as to allow free discharge of gasoline through the nozzle, the pressure in the chamber 81 is thereby reduced which permits acceleration of the plungers in the measuring unit and lowering of the pressure in the duct 35 and compartment 100 and consequent expansion of the cup 95 whereupon the valve 87 is thereby raised and the discharge of gasoline from the chamber 81 becomes restricted until normal pressure in the chamber is reestablished.

Upon closing of the nozzle valve completely, as when the dispensing operation has been concluded, operation of the plungers is stalled by the gasoline pent within the cylinders causing resistance of the cam mechanism to the action of the clutch, whereupon the torque applied by the engaging member to the friction drum is entirely overcome as said member continues to rotate. When the discharge of gasoline is thus stopped, circulation of the gasoline in the supply pump through the by-pass valve is resumed. The nozzle is then replaced upon the crank 126 causing the switch 127 to open and stop the motor thereby throwing the apparatus out of action.

By suitably turning the adjusting screw 31 pressure of the spring 30 against the by-pass valve 27 may be increased or decreased accordingly which will cause a corresponding variation of the pressure developed by the supply pump, and by suitably turning the adjusting screw 74 on the engaging member the torque imparted by the engaging member to the friction drum 70 may be increased or decreased accordingly which will cause a corresponding variation of the pressure developed in the chamber 81 by the measuring unit. It is desirable that the adjustment of the engaging member be made so that the pressure that is maintained in the discharge chamber shall exceed that in the inlet duct 35 of the measuring unit only to the extent required to insure proper operation of the plungers and the mechanism by which they are actuated. When the normal working pressure between the supply pump and the measuring unit is closely balanced with that in the discharge outlet of the measuring unit, leakage past the plungers and consequent error in measurement of the gasoline delivered through the measuring unit is substantially averted.

Should the quantity of gasoline delivered by the measuring unit upon each revolution of the cam-shaft fall below or exceed the predetermined amount, correction is made by manipulating the shaft 56 so as to cause adjustment of the eccentric 51 to correspondingly lengthen or shorten the stroke of the plunger 36' of the measuring pump whereby the quantity of the gasoline discharged through the measuring unit is increased or decreased as required.

Claims:

1. In liquid dispensing apparatus, a supply pump having a restrained by-pass valve and port controlled thereby between its suction and discharge chambers; an air and gas separating unit having a receiving chamber connected with the discharge chamber of said supply pump and a float chamber having communication with the upper end of the receiving chamber through a restricted opening, said float chamber having a vent at its top and a float valve controlled connection with the suction chamber of said supply pump; a measuring pump having valvular plungers therein, an inlet duct connecting at one of its ends with the receiving chamber of said separating unit, and an outlet chamber at its opposite end provided with a discharge pipe; a regulating means having a chamber containing a spring sustained compressible cup, a connection with the inlet duct of the measuring pump whereby said cup is compressed in opposition to its spring by pressure developed by said supply pump, and a valve operatively related with said cup controlling the discharge from the outlet chamber of the measuring pump; a mechanism operatively related with said plungers; a friction clutch adapted to apply torque yieldingly to said mechanism; a switch controlled motor having operative relation with said supply pump and said clutch; a dispensing hose in connection with said discharge pipe and having a valve controlled nozzle; means for suspending said nozzle adapted to cause opening of the motor switch upon suspension of the nozzle; and recording means operatively related with said measuring pump.

2. In liquid dispensing apparatus, the combination of a supply pump having a restrained by-pass valve connection between its suction and discharge chambers; an air separating unit having a receiving chamber communicating with the discharge member of said supply pump and a float chamber having restricted communication with the upper end of the receiving chamber, said float chamber having a vent at its top and a float valve controlled connection with the suction chamber of said supply pump; a measuring pump having at its receiving end communication with said separating unit and an outlet at its opposite end; a dispensing means connected with the outlet of said measuring pump and having a valve controlled nozzle; a regulating means having a valve controlling the outlet of the measuring pump and mechanism actuated by pressure developed by the supply pump whereby said valve is automatically opened; actuating mechanism for said measuring pump including a friction clutch adapted to apply torque yieldingly to the mechanism; a motor having driving connections with the supply pump and said clutch; and recording means operatively related with said measuring pump.

3. In liquid dispensing apparatus, the combination of a supply pump having a restrained by-pass valve connection between its suction and discharge chambers; a measuring pump having at one end a connection through which liquid is received from the supply pump and at its opposite end a discharge outlet; a dispensing means connected with the outlet of said measuring pump and having a valve controlled nozzle; a regulating means including a discharge valve controlling the outlet of said measuring pump and mechanism operatively related with the supply pump actuated by pressure developed thereby for automatically opening said discharge valve; actuating mechanism for said measuring pump having a friction clutch adapted to apply torque yieldingly to the mechanism; a recording means operatively related with said measuring pump; and driving means for the supply pump and clutch.

4. In liquid dispensing apparatus, the combination of a supply pump having a restrained by-pass connection between its suction and discharge chambers; a measuring pump receiving at one end liquid from the supply pump and having at its opposite end a discharge outlet; a dispensing means connected with said outlet provided with a manually operated normally closed valve; a regulating means for automatically controlling said outlet; a connection between said regulating means and the measuring pump whereby the regulating means is operated by pressure developed by said supply pump; mechanism adapted to yieldingly actuate said measuring pump; a recording means operatively related with said measuring pump; and driving means for the supply pump and the actuating mechanism for said measuring pump.

5. In liquid dispensing apparatus, a measuring pump; actuating mechanism for said pump; a motor-driven means adapted to yieldingly actuate said mechanism; a regulating means for controlling the discharge outlet of said pump; a dispensing means having a manually operated valve in connection with said outlet; means for supplying liquid under pressure to the receiving duct of said pump; a connection between said regulating means and said duct whereby operation of the regulating means is automatically governed by the pressure of liquid in said duct; and a recording means operatively connected with said pump and actuated concurrently therewith.

6. In liquid dispensing apparatus, a measuring pump receiving at one end thereof liquid under pressure from a suitable source of supply and having at its opposite end a discharge outlet; a dispensing means connected with said outlet provided with a manually operated valve; a regulating means for automatically controlling said outlet; a connection between said regulating means and the receiving end of said pump whereby operation of the regulating means is governed by the pressure of liquid therein; mechanism including a motor-driven friction clutch adapted to yieldingly actuate said measuring pump; and a recording means operatively connected with said pump and actuated concurrently therewith.

7. In liquid dispensing apparatus, a measuring pump; a motor driven mechanism adapted to yieldingly actuate said pump; means for supplying liquid under pressure to the inlet duct of said pump; a regulating means for controlling the discharge outlet of said pump; a manually operated valve controlled dispensing means connected with said outlet; a connection between said duct and regulating means through which pressure of liquid in the duct is imparted to the regulating means whereby operation of the regulating means is automatically governed; and a recording means actuated concurrently with said pump.

8. In liquid dispensing apparatus, a measuring pump; means for supplying liquid under pressure to the inlet duct of said pump; mechanism for yieldingly actuating said pump; a valve controlling the outlet of said pump; a chamber having a connection with said intake duct whereby the pressure therein is imparted to said chamber; a spring sustained compressible cup in said chamber; actuated by the pressure therein and operatively related with said valve whereby the discharge from said outlet is automatically restricted upon lowering of the pressure in said intake duct; a manually operated valve controlled dispensing means connected with said outlet; and a recording means actuated concurrently with said pump.

9. In liquid dispensing apparatus, a measuring pump; means for supplying liquid under pressure to the inlet duct of said pump; mechanism for yieldingly actuating said pump; a valve controlling the outlet of said pump; a chamber having a connection with said intake duct whereby the pressure therein is imparted to said chamber; a spring sustained compressible cup in said chamber actuated by the pressure therein and operatively related with said valve whereby the discharge from said outlet is automatically restricted upon lowering of the pressure in said intake duct; and a manually operated valve controlled dispensing means connected with said outlet.

10. In liquid dispensing apparatus, a measuring pump; means for supplying liquid under pressure to the inlet duct of said pump; mechanism for yieldingly actuating said pump; a valve controlling the outlet of said pump; a chamber having a connection with said intake duct whereby the pressure therein is imparted to said chamber; a spring sustained compressible cup in said chamber actuated by the pressure therein and operatively related with said valve whereby the discharge from said outlet is automatically restricted upon lowering of the pressure in said intake duct; and a recording means actuated concurrently with said pump.

11. In liquid dispensing apparatus, a measuring pump; means for supplying liquid under pressure to the inlet duct of said pump; mechanism for yieldingly actuating said pump; a valve controlling the outlet of said pump; a chamber having a connection with said intake duct whereby the pressure therein is imparted to said chamber; and a spring sustained compressible cup in said chamber actuated by the pressure therein and operatively related with said valve whereby the discharge from said outlet is automatically restricted upon lowering of the pressure in said intake duct.

12. In liquid dispensing apparatus, a measuring pump; means for supplying liquid under pressure to the inlet duct of said pump; mechanism for yieldingly actuating said pump; a regulating means consisting of a valve controlling the discharge outlet of the pump; a chamber having a connection with said intake duct whereby the pressure therein is imparted to the chamber; a spring sustained compressible member in said chamber actuated by the pressure therein and operatively related with said valve, a second spring sustained compressible member dividing said second chamber into two separate compartments, one of which compartments has connection with the outlet chamber of the pump and the other compartment having connection with the intake duct of the pump so pressure in said outlet chamber and said inlet duct is applied to said second compressible member in opposite directions, an operative connection between said valve and said second member; a manually operated valve controlled dispensing means connected with said outlet; and a recording means actuated concurrently with said pump.

13. In liquid dispensing apparatus, a measuring pump having an inlet duct and a discharge outlet; mechanism for yieldingly actuating said pump; means for supplying liquid under pressure to said inlet duct; a valve controlling said discharge outlet; a compressible member operatively related with said valve and arranged so as to be actuated and open said valve by a pressure derived from that in said duct; a second compressible member operatively related with said valve; means in connection with said inlet duct and the outlet chamber of said pump whereby pressure in said inlet duct and outlet chamber is applied to said second compressible member in opposite directions; a manually operated valve controlled dispensing means connected with said outlet; and a recording means actuated concurrently with said pump.

14. In liquid dispensing apparatus, a measuring pump having an inlet duct and a discharge outlet; mechanism for yieldingly actuating said pump; means for supplying liquid under pressure to said inlet duct; a valve controlling said discharge outlet; a compressible member operatively related with said valve and arranged so as to be actuated and open said valve by a pressure derived from that in said inlet duct; a second compressible member operatively related with said valve; means in connection with said inlet duct and the outlet chamber of said pump whereby pressure in said inlet duct and outlet chamber is applied to said second compressible member in opposite directions; and a manually operated valve controlled dispensing means connected with said outlet.

15. In liquid dispensing apparatus, a measuring pump having an inlet duct and a discharge outlet; mechanism for yieldingly actuating said pump; means for supplying liquid under pressure to said inlet duct; a valve controlling said discharge outlet; a compressible member operatively related with said valve and arranged so as to be actuated and open said valve by a pressure derived from that in said inlet duct; a second compressible member operatively related with said valve; means in connection with said inlet duct and the outlet chamber of said pump whereby pressure in said inlet duct and outlet chamber is applied to said second compressible member in opposite directions; and a recording means actuated concurrently with said pump.

16. In liquid dispensing apparatus, a measuring pump having an inlet duct and a discharge outlet; mechanism for yieldingly actuating said pump; means for supplying liquid under pressure to said inlet duct; a valve controlling said discharge outlet; a compressible member operatively related with said valve and arranged so as to be actuated and open said valve by a pressure derived from that in said inlet duct; a second compressible member operatively related with said valve; and means in connection with said inlet duct and the outlet chamber of said pump whereby pressure in said inlet duct and outlet chamber is applied to said second compressible member in opposite directions.

17. In liquid dispensing apparatus, a measuring pump; mechanism adapted to yieldingly actuate said pump; means for supplying liquid under pressure to the inlet duct of said pump; a manually operated valve controlled dispensing means connected with the discharge outlet of said pump; a regulating means having a valve controlling said discharge outlet and a member operatively connected with said valve and said inlet duct whereby said valve is opened by pressure of liquid derived from the inlet duct; and a recording means actuated concurrently with said pump.

18. In liquid dispensing apparatus, a measuring pump; mechanism adapted to yieldingly actuate said pump; means for supplying liquid under pressure to the inlet duct of said pump; a regulating means having a valve controlling said discharge outlet and a member operatively connected with said valve and said inlet duct whereby said valve is opened by pressure of liquid derived from the inlet duct; and a recording means actuated concurrently with said pump.

19. In liquid dispensing apparatus, a measuring pump; mechanism adapted to yieldingly actuate said pump; means for supplying liquid under pressure to the inlet duct of said pump; a manually operated valve controlled dispensing means connected with the discharge outlet of said pump; and a regulating means having a valve controlling said discharge outlet and a member operatively connected with said valve and said inlet duct whereby said valve is opened by pressure of liquid derived from the inlet duct.

20. In liquid dispensing apparatus, a measuring pump; mechanism adapted to yieldingly actuate said pump; means for supplying liquid under pressure to the inlet duct of said pump; and a regulating means having a valve controlling said discharge outlet and a member operatively connected with said valve and said inlet duct whereby said valve is opened by pressure or liquid derived from the inlet duct.

21. In combination with a liquid measuring pump, means for supplying liquid under pressure to the inlet duct of said pump, mechanism adapted to yieldingly actuate said pump, manually operated valve controlled dispensing means connected with the discharge outlet of said pump, a valve controlling the discharge outlet of the pump, and regulating means operatively related with said valve and the intake duct of said pump adapted to open said valve automatically operated by the pressure of liquid derived from said inlet duct.

22. In combination with a liquid measuring pump, means for supplying liquid under pressure to the inlet duct of said pump, mechanism adapted to yieldingly actuate said pump, manually operated valve controlled dispensing means connected with the discharge outlet of said pump, and regulating means having a valve for controlling the discharge outlet of the pump adapted to open said valve automatically operated by the pressure of liquid derived from the inlet duct.

23. In combination with a liquid measuring pump, means for supplying liquid under pressure to the inlet duct of said pump, mechanism adapted to yieldingly actuate said pump, and regulating means having a valve for controlling the discharge outlet of the pump adapted to open said valve automatically operated by the pressure of liquid derived from the inlet duct.

24. In combination, a liquid measuring pump, means for supplying liquid under pressure to the inlet duct of said pump, mechanism adapted to yieldingly actuate said pump, a dispensing means connected with the outlet chamber of said pump provided with a valve, a regulating valve controlling the outlet from said chamber into said dispensing means, means having a compressible member operatively connected with the regulating valve and with the inlet duct of said pump whereby the compressible member is actuated by pressure derived from said duct and the regulating valve thereby automatically opened, and a second compressible member operatively related with said regulating valve and connected with said inlet duct and also with said outlet chamber so that pressure derived from said chamber and from said duct is applied oppositely to said second member whereby the regulating valve is automatically closed when pressure in the intake duct approaches that in said outlet chamber.

25. In combination, a liquid measuring pump, means for supplying liquid under pressure to the inlet duct of said pump, mechanism adapted to yieldingly actuate said pump, a valve controlling the discharge from the outlet chamber of said pump, means having a compressible member operatively connected with said valve and with the inlet duct of said pump whereby the compressible member is actuated by pressure derived from said duct and said valve automatically opened thereby, and a second compressible member operatively related with said valve and connected with said inlet duct and also with the outlet chamber of said pump so that pressure derived from said chamber and from said duct is applied oppositely to said second member whereby the regulating valve is automatically closed when pressure in the intake duct approaches that in said member.

26. In apparatus of the class described, a pump having a spring restrained by-pass valve-controlled connection between its outlet and suction chambers, an air separating means having a receiving chamber and a float chamber provided with a restricted passageway therebetween, said receiving chamber having communication with the outlet chamber of said pump and provided with a liquid discharge duct, a connection between said float chamber and the suction chamber of said pump, a float actuated valve including a float in said float chamber for controlling said connection, an air vent for said float chamber, and dispensing means receiving liquid through said duct.

27. In apparatus of the class described, a liquid measuring means, a dispensing means connected with the outlet of said measuring means, a regulating valve for said outlet, a pump supplying liquid under pressure to said measuring means, a restrained by-pass valve located between the outlet and suction chambers of the pump adapted to automatically open and permit idle operation of the pump when said dispensing means is shut off, and means governed by the pressures developed by said measuring means and supply pump for controlling said regulating valve operable upon relative variation between said pressures.

28. In apparatus of the class described, a liquid measuring means having intake and outlet openings, a supply pump connected with said intake opening, a regulating valve for said outlet opening, means governed by the pressures developed by said measuring means and supply pump for controlling said regulating valve operable upon relative variation between said pressures, and a restrained by-pass valve adapted to automatically open and permit idle operation of the supply pump as the discharge through said outlet opening is restricted.

29. In apparatus of the class described, a liquid measuring means having intake and outlet openings, a supply pump connected with said intake opening, a regulating valve for said outlet opening, and means governed by the pressures developed by said measuring means and supply pump for controlling said regulating valve operable upon relative variation between said pressures.

30. In combination with a pump for liquid having a suction chamber and an outlet chamber and a port affording communication between said chambers, a restrained by-pass valve normally closing said port, an air separating means having a receiving chamber and a float chamber provided with a restricted air passageway therebetween, said receiving chamber having communication with the outlet chamber of said pump and provided with a liquid discharge outlet, a connection for liquid between said float chamber and the suction chamber of said pump, said float chamber having an air vent, and a float actuated valve including a float in said float chamber for controlling said connection.

31. In combination with a pump for liquid having a suction chamber and an outlet chamber, an air separating means having a receiving chamber and a float chamber provided with a restricted air passageway therebetween, said receiving chamber having communication with the outlet chamber of said pump and provided with a liquid discharge outlet, a connection for liquid between said float chamber and the suction chamber of said pump, said float chamber having an air vent, and a float actuated valve including a float in said float chamber for controlling said connection.

In testimony whereof I affix my signature.

REUBEN E. BECHTOLD.

for controlling said regulating valve operable upon relative variation between said pressures.

28. In apparatus of the class described, a liquid measuring means having intake and outlet openings, a supply pump connected with said intake opening, a regulating valve for said outlet opening, means governed by the pressures developed by said measuring means and supply pump for controlling said regulating valve operable upon relative variation between said pressures, and a restrained by-pass valve adapted to automatically open and permit idle operation of the supply pump as the discharge through said outlet opening is restricted.

29. In apparatus of the class described, a liquid measuring means having intake and outlet openings, a supply pump connected with said intake opening, a regulating valve for said outlet opening, and means governed by the pressures developed by said measuring means and supply pump for controlling said regulating valve operable upon relative variation between said pressures.

30. In combination with a pump for liquid having a suction chamber and an outlet chamber and a port affording communication between said chambers, a restrained by-pass valve normally closing said port, an air separating means having a receiving chamber and a float chamber provided with a restricted air passageway therebetween, said receiving chamber having communication with the outlet chamber of said pump and provided with a liquid discharge outlet, a connection for liquid between said float chamber and the suction chamber of said pump, said float chamber having an air vent, and a float actuated valve including a float in said float chamber for controlling said connection.

31. In combination with a pump for liquid having a suction chamber and an outlet chamber, an air separating means having a receiving chamber and a float chamber provided with a restricted air passageway therebetween, said receiving chamber having communication with the outlet chamber of said pump and provided with a liquid discharge outlet, a connection for liquid between said float chamber and the suction chamber of said pump, said float chamber having an air vent, and a float actuated valve including a float in said float chamber for controlling said connection.

In testimony whereof I affix my signature.
REUBEN E. BECHTOLD.

DISCLAIMER 1,826,340.—*Reuben E. Bechtold*, Fort Wayne, Ind. LIQUID DISPENSING APPARATUS. Patent dated October 6, 1931. Disclaimer filed November 10, 1938, by the assignee, *S. F. Bowser and Company, Incorporated*.
Hereby enters this disclaimer to claim 31 in said specification.
[*Official Gazette December 6, 1938.*]

DISCLAIMER 1,826,340.—*Reuben E. Bechtold*, Fort Wayne, Ind. LIQUID DISPENSING APPARATUS. Patent dated October 6, 1931. Disclaimer filed November 10, 1938, by the assignee, *S. F. Bowser and Company, Incorporated*.

Hereby enters this disclaimer to claim 31 in said specification.

[*Official Gazette December 6, 1938.*]